(12) United States Patent
Demetriou et al.

(10) Patent No.: US 11,049,052 B2
(45) Date of Patent: Jun. 29, 2021

(54) AUTOMATED MANAGING OF A DATA CENTER INSTALLATION

(71) Applicant: INTERNATIONAL BUSINESS MACHINES CORPORATION, Armonk, NY (US)

(72) Inventors: Dustin W. Demetriou, New York, NY (US); Vidhya Shankar Venkatesan, Bangalore (IN); Milnes P. David, Poughkeepsie, NY (US); Michael J. Ellsworth, Jr., Lagrangefille, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 331 days.

(21) Appl. No.: 15/968,890

(22) Filed: May 2, 2018

(65) Prior Publication Data
US 2019/0340552 A1 Nov. 7, 2019

(51) Int. Cl.
*G06Q 10/06* (2012.01)
*G06T 1/00* (2006.01)
(Continued)

(52) U.S. Cl.
CPC ..... *G06Q 10/06313* (2013.01); *G06K 9/6288* (2013.01); *G06T 1/0014* (2013.01);
(Continued)

(58) Field of Classification Search
None
See application file for complete search history.

(56) References Cited

U.S. PATENT DOCUMENTS 7,054,793 B2 * 5/2006 Moritz ............... G06T 17/00
345/581
7,072,739 B2 7/2006 Bash et al.
(Continued)

FOREIGN PATENT DOCUMENTS

CN 106125744 A 11/2016
JP 2015151273 A 8/2015
(Continued)

OTHER PUBLICATIONS

Chris Mansley et al, Robotic Mapping and Monitoring of Data Centers, May 9-13, 2011, IEEE International Conference on Robotics and Automation, pp. 5905-5910 (Year: 2011).*
(Continued)

*Primary Examiner* — Amanda Gurski
(74) *Attorney, Agent, or Firm* — Tihon Poltavets, Esq.; Kevin P. Radigan, Esq.; Heslin Rothenberg Farley & Mesiti P.C.

(57) ABSTRACT

Automated managing of a data center installation is provided. The managing includes evaluating, at least in part by image processing analysis, a captured image of at least a portion of the data center installation to identify a component-related deficiency within the data center installation. One or more measurements within a data center are used to determine an energy penalty due to the identified component-related deficiency within the data center installation, and an action to correct the component-related deficiency within the data center installation is initiated based on the energy penalty exceeding a predefined threshold.

13 Claims, 11 Drawing Sheets

(51) Int. Cl.
  *G06K 9/62* (2006.01)
  *H04L 12/26* (2006.01)
  *H04L 12/24* (2006.01)
  *H04L 12/14* (2006.01)
  *G06T 7/20* (2017.01)

(52) U.S. Cl.
  CPC ............ *G06T 7/20* (2013.01); *H04L 12/1432* (2013.01); *H04L 41/145* (2013.01); *H04L 43/16* (2013.01); *G06T 2207/30164* (2013.01)

(56) References Cited

U.S. PATENT DOCUMENTS

| | | | |
|---|---|---|---|
| 9,463,574 B2 | 10/2016 | Purkayastha et al. | |
| 2004/0243280 A1* | 12/2004 | Bash | G05D 1/0246 700/245 |
| 2005/0038562 A1* | 2/2005 | Bash | G05D 1/0274 700/245 |
| 2009/0138313 A1* | 5/2009 | Morgan | G06Q 10/06313 705/7.23 |
| 2017/0225336 A1 | 8/2017 | Deyle et al. | |

FOREIGN PATENT DOCUMENTS

| | | | | |
|---|---|---|---|---|
| WO | 2016083897 A2 | 6/2016 | | |
| WO | WO-2016083897 A2 * | 6/2016 | ............... | G06T 7/70 |

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).

International Business Machines Corporation (IBM), "z/Architecture Principles of Operation," IBM® Publication No. SA22-7832-10, Eleventh Edition, Mar. 2015, (pp. 1-1732).

International Business Machines Corporation (IBM), "Power ISA™ Version 2.07B," Apr. 9, 2015, (pp. 1-1527).

Mansley, et al., "Robotic Mapping and Monitoring of Data Centers," IEEE International Conference on Robotics and Automation (ICRA), May 9-13, 2011 (pp. 1-6).

Anonymous, "Automatic System to Detect and Report Air Leakage in a Data Center," IPCOM000240531D, Feb. 5, 2015 (pp. 1-2).

* cited by examiner

AUTOMATED MANAGING OF A DATA CENTER INSTALLATION

BACKGROUND

The heat dissipated by today's computing equipment is reaching levels that make it challenging to cool the computing equipment in densely packaged data centers. In a data center installation, the computing equipment, such as a multitude of computer servers, are commonly placed in a series of racks arranged in one or more rows of the data center. Typically, the data center has a cooling system that includes, by way of example, one or more air conditioning units. The one or more air conditioning units provide cool air to the racks via, for example, a subfloor or overhead plenum and associated perforated tiles or diffusers. Without proper data center component installation, costly inefficiencies in, for instance, operation of the computing environment and/or the cooling system may occur, such as inefficient cooling of one or more electronics racks and/or a reduction of energy efficiency within the data center.

SUMMARY

Certain shortcomings of the prior art are overcome and additional advantages are provided through the provision, in one or more aspects, of a method of managing a data center installation, which includes evaluating, at least in part by image processing analysis, a captured image of at least a portion of the data center installation to identify a component-related deficiency within the data center installation, and determining, based at least in part on one or more measurements within the data center installation, an energy penalty due to the identified component-related deficiency within the data center installation. The method further includes initiating an action, based on the energy penalty exceeding a predefined threshold, to correct the component-related deficiency within the data center installation.

In another aspect, a system for managing a data center installation is provided. The system includes a memory, and a processor communicatively coupled to the memory. The system performs a method, which includes evaluating, at least in part by image processing analysis, a captured image of at least a portion of the data center installation to identify a component-related deficiency within the data center installation, and determining, based at least in part on one or more measurements within the data center installation, an energy penalty due to the identified component-related deficiency within the data center installation. Further, the method includes, based on the energy penalty exceeding a predefined threshold, initiating an action to correct the component related deficiency within the data center installation.

In a further aspect, a computer program product is provided for managing a data center installation. The computer program product includes a computer readable storage medium having program instructions embodied therewith. The program instructions are executable by a processor to cause the processor to: evaluate, at least in part by image processing analysis, a captured image of at least a portion of the data center installation to identify a component related deficiency within the data center installation; determine, based at least in part on one or more measurements within the data center installation, an energy penalty due to the identified component-related deficiency within the data center installation. Based on the energy penalty exceeding a predefined threshold, an action is initiated to correct the component-related deficiency within the data center installation.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
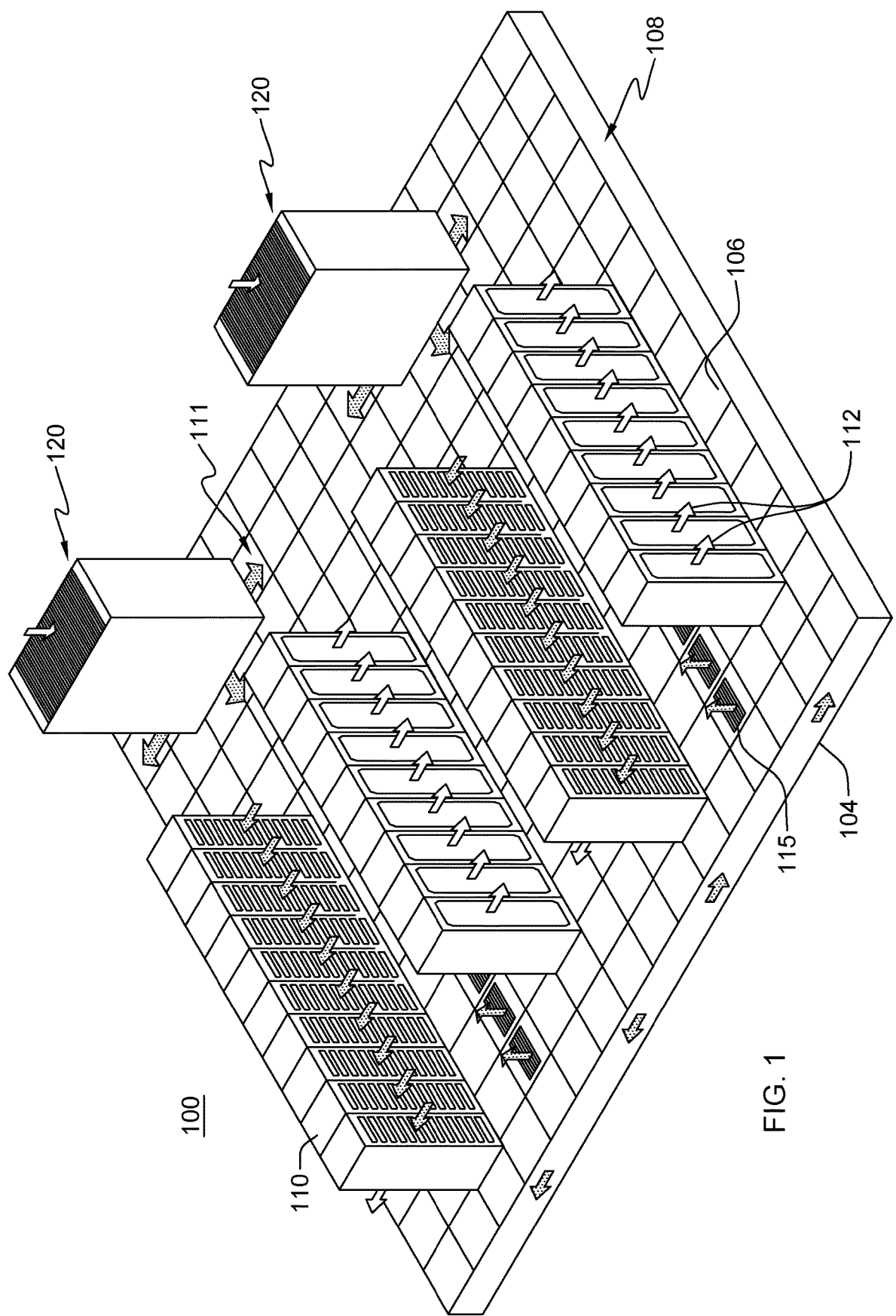
FIG. 1 depicts one embodiment of a data center installation which may be managed, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application to facilitate, for instance, automated managing of a data center installation.

The illustrative embodiments may be described below using specific code, designs, architectures, protocols, layouts, schematics, or tools only as examples, and are not limited to the illustrative embodiments. Furthermore, the illustrative embodiments may be described in certain instances using particular software, tools, and data processing environments only as example for clarity of description. The illustrative embodiments may be used in conjunction with other comparable or similarly purposed structures, systems, applications, or architectures. An illustrative embodiment may be implemented in hardware, software, or a combination thereof.

The examples in this disclosure are used only for clarity of description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

A data center installation may experience a number of component adds, moves and/or changes (AMCs) to, for instance, the computing equipment housed in the racks of the data center, or to the racks themselves, or to other data center components, such as network cables, floor tiles, diffusers, power cables, air-conditioning system components, etc. In many data centers, the entity or group responsible for installing the computing equipment or other data center components is not responsible for energy efficiency within the data center. Further, it is common that the entity or organization responsible for energy efficiency within the data center may not have physical access to the data center installation itself. Often times the AMC modifications may be manual in nature, and subject to human error. For instance, in certain cases, a deficiency in the process of performing the AMC may be the reason for a resultant energy penalty.

Reference is made below to the drawings, which may not be drawn to scale for ease of understanding, wherein the same reference numbers used throughout the different figures designate the same or similar components.

FIG. 1 depicts one embodiment of a data center installation 100, which in one example, is a raised floor layout of an air-cooled computer room or data center. Data center installation 100 includes computing (or information technology (IT)) racks 110 disposed in one or more rows on a raised floor 106 of data center installation 100. One or more air-conditioning units 120 (also referred to as computer room air-conditioners (CRACs)) take in hot air (for example, through one or more air inlet vents in the top of the CRACs) and exhaust cooled air into a sub-floor plenum 108 below raised floor 106. Hot airflow through data center installation 100 is generally depicted by light arrows 112, and cooled airflow through data center installation 100 is indicated by stippled arrows 111.

In FIG. 1, racks 110 employ a front-to-back cooling approach. Namely, according to this approach, cooled air 111 is drawn in through a front (air inlet side) of each rack, and hot air 112 is exhausted from a back (air outlet side) of each rack. The cooled air drawn into the front of the rack is supplied to air inlets of the computing components (e.g., servers) disposed within the racks. Space between raised floor 106 and a sub-floor 104 defines the sub-floor plenum 108. Sub-floor plenum 108 may serve as a conduit to transport, for example, cooled air 111 from the air-conditioning units 120 to the racks. In one embodiment, racks 110 are arranged in a hot aisle/cold aisle configuration, with their air inlet sides and air outlet sides disposed in alternating directions, as illustrated in FIG. 1. Cooled air 111 may be provided through one or more perforated floor tiles 115 in raised floor 106 from sub-floor plenum 108 into the cold aisles of the data center. The cooled air 111 is then drawn into racks 110, via their inlets, and subsequently exhausted into the data center via one or more air outlets of the individual racks into the hot aisles of the data center.

In one or more implementations, the air-conditioning units 120 may receive chilled water from a refrigeration chiller plant (not shown). Each air-conditioning unit includes a mechanism to circulate air through the air-conditioning unit, and to provide the cooled air 111 to the sub-floor plenum 108.

The pervasive trend of increasing heat flux and power dissipation of information technology (IT) equipment, continues to present a significant challenge to air cooled data center facilities, which can contain as many as several thousand pieces of IT equipment. In order to maintain high reliability, adequate air cooling needs to be provided according to equipment specifications. As power dissipation increases, so do the cooling requirements, necessitating ever higher IT equipment air flow rates and cooling supply air flow rates. This can lead to complex flow patterns and temperature distributions within a data center installation. In order to better understand data center air flow and reduce mixing of hot and cold air streams, which degrades cooling efficiency, computational fluid dynamics and heat transfer (CFD/HT) modeling may be employed in the design and optimization of a data center. As much as 1.5% of the world's and 2.2% of the United States' electrical power may be consumed by data centers, and roughly half of that is used for cooling. Thus, optimizing data center cooling to minimize power consumption continues to be an industry imperative.

Figure 2:
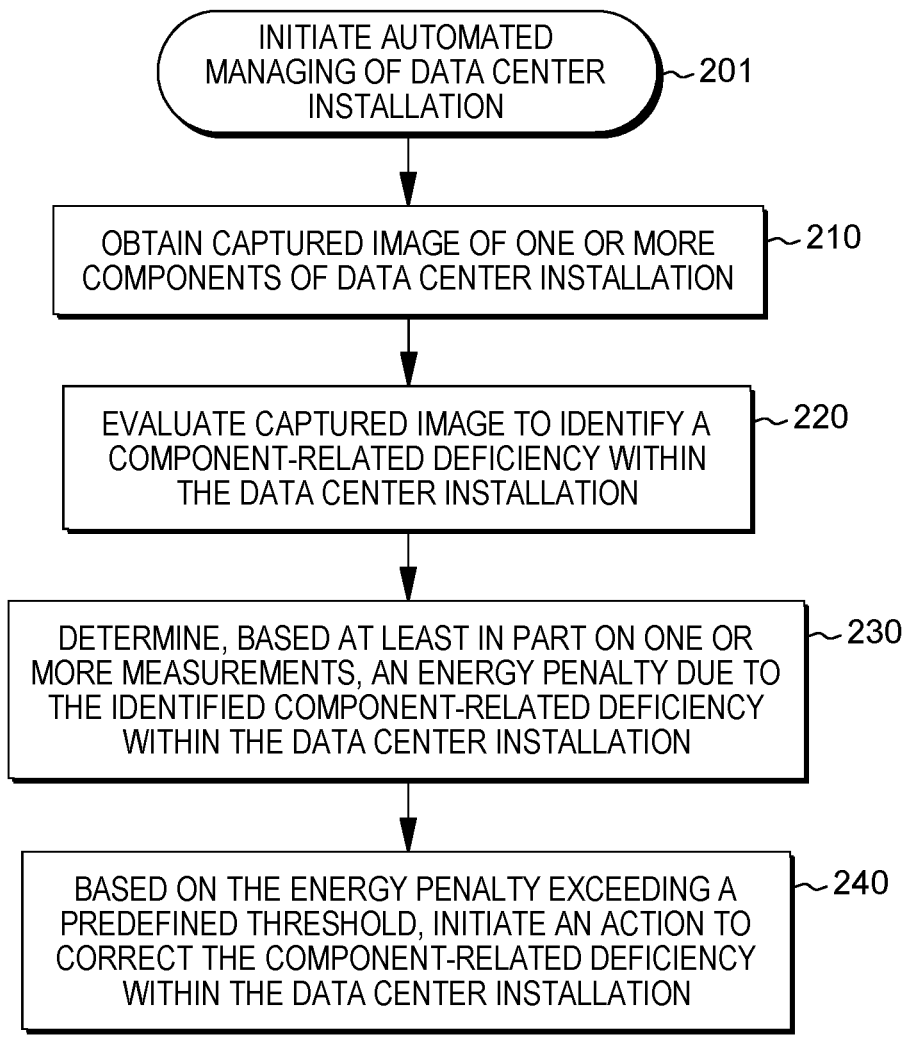
FIG. 2 depicts one embodiment of an automated process of managing a data center installation, in accordance with one or more aspects of the present invention.

Disclosed herein, in one or more aspects, are methods, systems and computer program products which facilitate managing of a data center installation. By way of example, FIG. 2 depicts one embodiment of a process 200 for automated managing of a data center installation. The automated managing is initiated 201 and a captured image of one or more components of the data center installation is obtained 210. The captured image is evaluated, for instance, at least in part by image processing analytics, to identify a current component-related deficiency within the data center installation 220. Based at least in part on one or more actual measurements within the data center installation, processing may determine an energy penalty due to the identified component-related deficiency within the data center installation 230, and based on the energy penalty exceeding a predefined threshold, an action may be initiated to correct the component-related deficiency within the data center installation 240. In one or more aspects, the action may be or involve an add, move and/or change (AMC) to one or more components of the data center to, for instance, correct the identified component-related deficiency within the data center installation.

In one or more implementations, the process may include receiving the captured image for evaluation from a robotic system within the data center installation, with the captured image being captured by the robotic system. Further, in one or more embodiments, the robotic system may be sent to a region of the data center installation where one or more component-related adds, moves or changes have recently been performed, and the captured image may capture the region of the data center installation where the one or more component related adds, moves or changes have been performed. Further, in one or more embodiments, the process may include receiving at least one measurement of the one or more measurements within the data center installation from at least one sensor associated with the robotic system. Additionally, the robotic system may include at least one manipulator, and the action to correct the component-related deficiency may be performed, at least in part, by the robotic system using the at least one manipulator.

In one or more embodiments, the evaluating of the captured image may include comparing the captured image to one or more saved images. The one or more saved images may be images of proper data center components and/or images of properly installed data center components. In one or more embodiments, determining the energy penalty may include ascertaining a degree of thermal/fluid-related deficiency within the data center installation associated with a component-related deficiency, and using the degree of thermal/fluid-related deficiency and determining the energy penalty due to the identified component-related deficiency of the data center. Ascertaining the degree of thermal/fluid-related deficiency may include comparing the one or more measurements to one or more predicted values for the one or more measurements based on, for instance, one or more computational fluid dynamic models of the data center installation incorporating one or more specified component-related actions. The one or more specified component-related actions may be component adds, component moves or component changes within the data center installation.

Figure 3A:
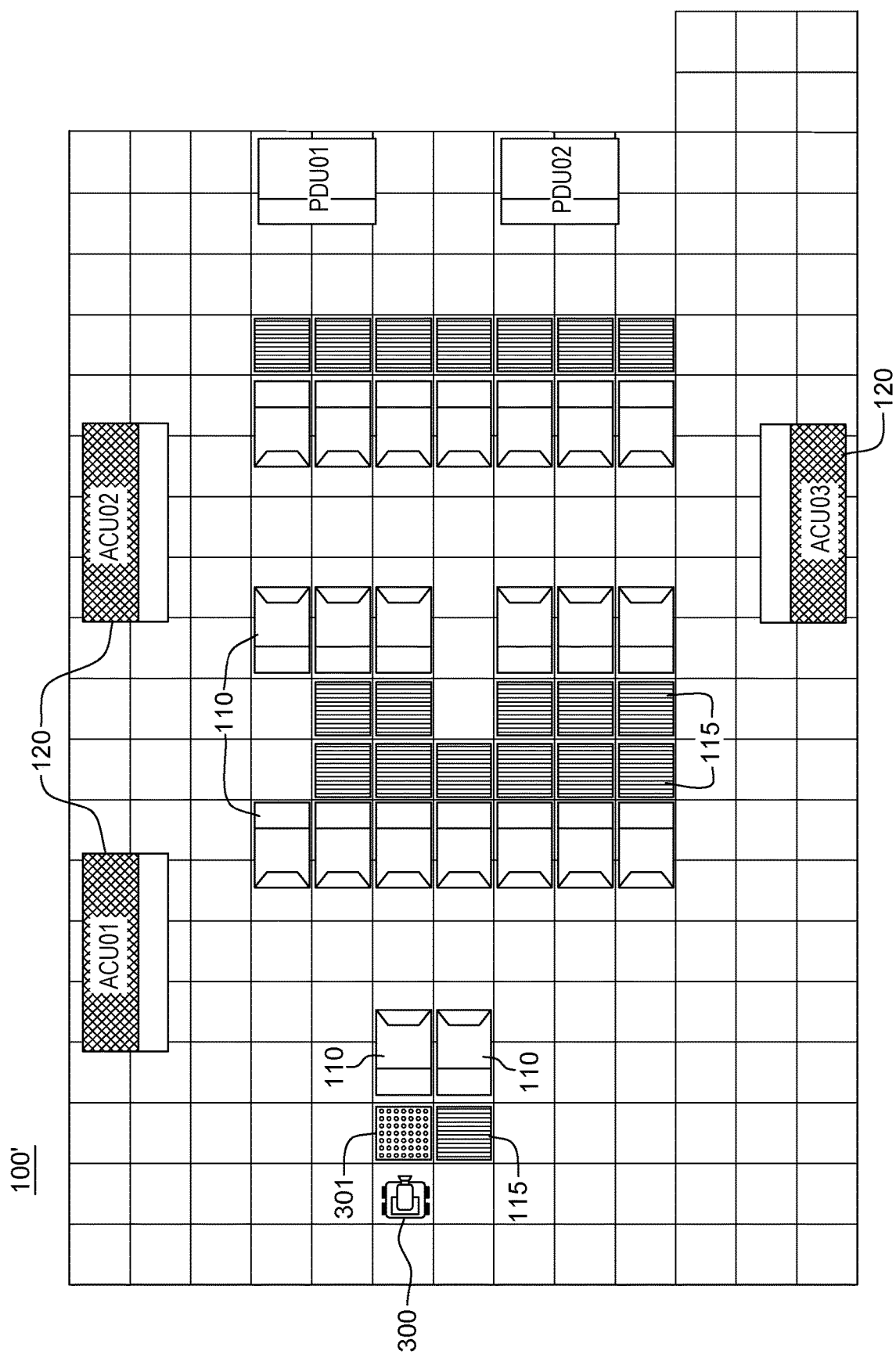
FIG. 3A is a plan view of one embodiment of a data center installation, with a robotic system being employed to facilitate managing of the data center installation, in accordance with one or more aspects of the present invention.

In one or more embodiments, automated managing of a data center installation may be accomplished, at least in part, using a robotic system, and in particular, a robotic system capable of traversing the data center installation to, for instance, capture images of one or more components of the data center installation, and in certain embodiments, perform one or more actions to correct a component-related deficiency identified within the data center installation. By way of example, FIG. 3A depicts a plan view of a data center installation 100' which includes a plurality of racks 110 disposed in rows on a raised floor of the data center installation. In one or more implementations, air conditioning units 120 take in hot air (for example, through one or more air inlet vents in the top of the units) and exhaust cool air into a subfloor plenum below the raised floor. As with the data center installation of FIG. 1, racks 110 may again be arranged in a front to back cooling approach. In this configuration, cooled air is drawn through perforated floor tiles 115 in the raised floor from the subfloor plenum into the cold aisles of the data center, at the fronts or air inlet sides of the racks 110. In the embodiment of FIG. 3A, power distribution units PDU01 and PDU02 are also illustrated, with power cabling to the racks 110 also passing through the underfloor plenum, in one or more embodiments.

Figure 3B:
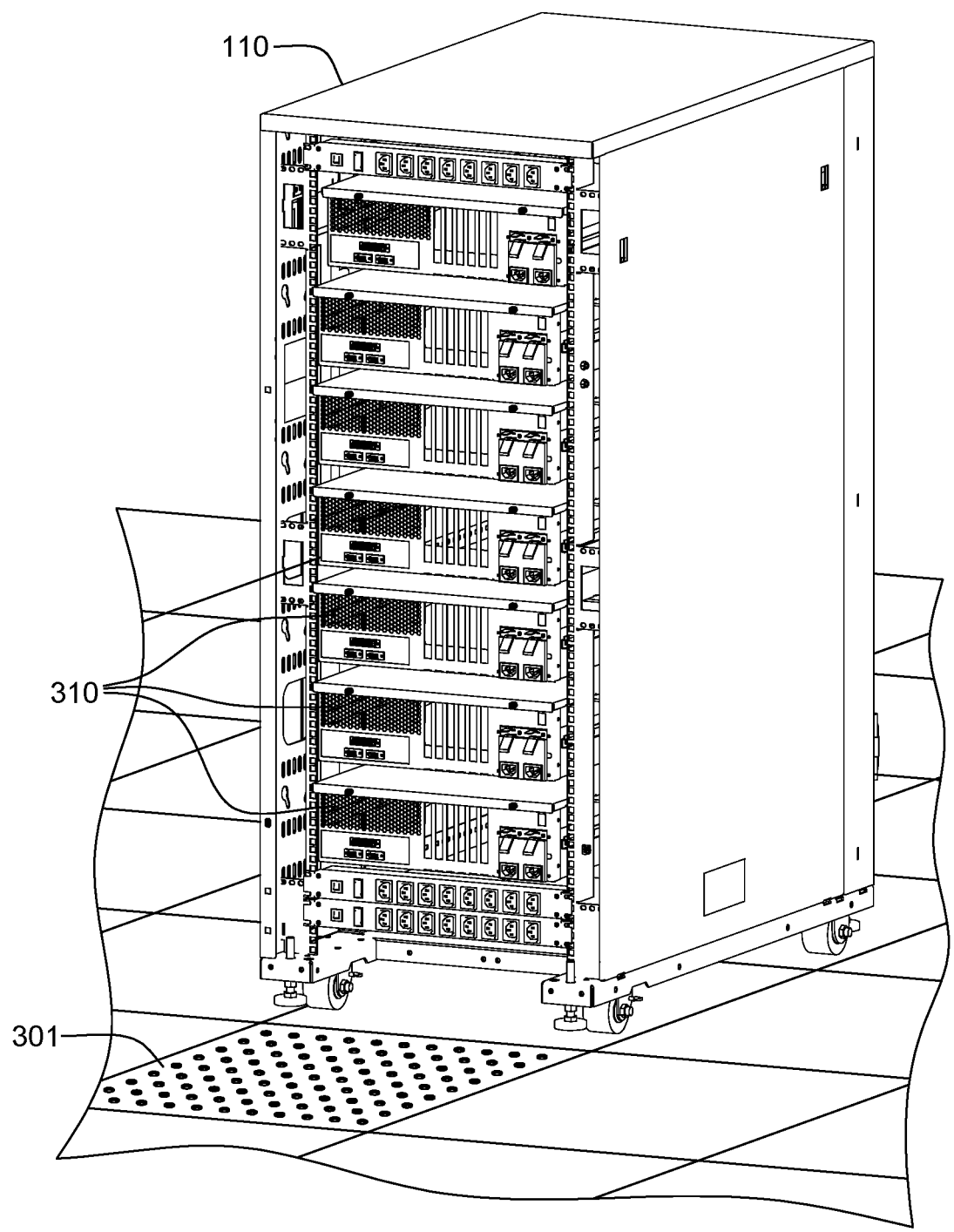
FIG. 3B depicts one embodiment of a captured image of a portion of the data center installation of FIG. 3A, and which is to be evaluated, in accordance with one or more aspects of the present invention.

A robotic system 300 or robot is shown in the data center installation 100' of FIG. 3A in front of an electronics rack 110 with a perforated tile 301 that may be different from the specified perforated tile for that location, that is, as one example of a component-related deficiency within the data center installation. In operation, robotic system 300 may be instructed to traverse the data center installation to a specified region or area within the data center, and robotic system 300, and the associated managing process described herein, may cooperate (in one or more embodiments) to identify one or more component-related defects in the installation of one or more data center components at the specified region, and based thereon, to assess an energy penalty related to the deficiency, and thus, assess the energy benefit of taking corrective action to the identified component-related deficiency at that specified location. In one or more embodiments, the robotic system may capture an image of at least a portion of the data center installation at the specified region of the data center. For instance, the captured image may be of a particular component within the data center installation, or a combination of components within the data center installation. FIG. 3B depicts one embodiment of a captured image which includes the rack 110, with a plurality of systems or servers 310, and perforated floor tile 301 in front of rack 110 at the location of the robotic system in FIG. 3A. As explained further herein, in one or more implementations, the robotic system may be in communication with and/or include a vision system, as well as a computer system capable of processing the captured image and performing the processing described.

Figure 4A:
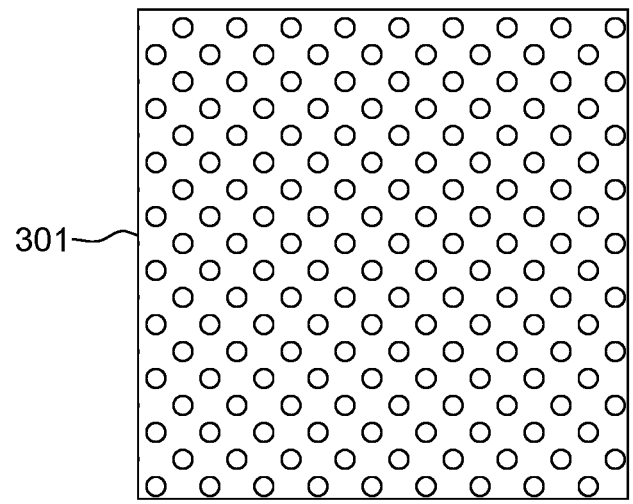
FIG. 4A is a plan view of a floor tile in the captured image of FIG. 3B, which is to be evaluated as part of managing the data center installation, in accordance with one or more aspects of the present invention.
Figure 4B:
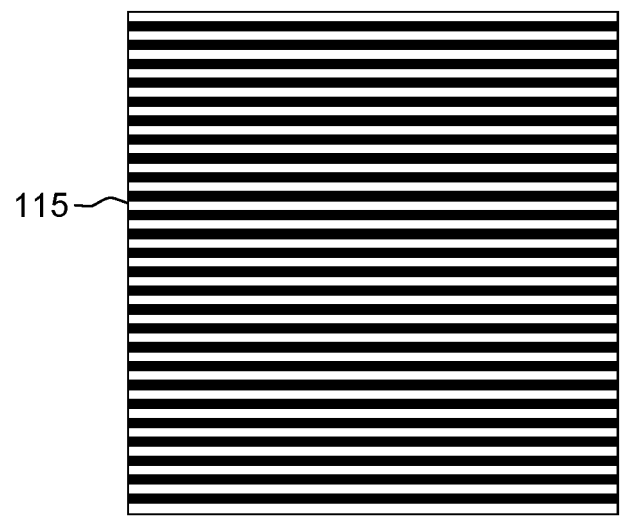
FIG. 4B is a plan view image of an anticipated, specified floor tile for the data center installation region depicted in the captured image, and which is referenced in automated managing of the data center installation, in accordance with one or more aspects of the present invention.

By way of example, the robotic system or computer system may access a database of images of specified data center components and/or properly installed data center components. The database of images may be saved within the robotic system, or separate from the robotic system, for instance, within the computer system referenced herein. Alternatively, the database could be a cloud-based database remotely accessed by the robotic system and/or computer system across a network. Using available image analytics techniques, the system may identify a component-related deficiency in the installation by comparing the captured image to one or more images in the database of specified data center components and/or properly installed data center components. For instance, FIG. 4A depicts a plan view of perforated floor tile 301 of FIGS. 3A & 3B, while FIG. 4B depicts a plan view of the specified perforated floor tile 115 (in one embodiment) for the region in front of rack 110 depicted in FIG. 3B. By way of example, an add, move or change (AMC) request (or instruction) may have specified perforated floor tile 115 with, for instance, a 60% open grate to be installed in front of the rack, while the actual installed floor tile may have been a 20% open perforated tile, such as perforated floor tile 301 depicted in FIGS. 3B & 4A. Based on this identified component-related deficiency, the robotic system, or the computer system in communication with a robotic system, determines a degree of deficiency, such as a degree of thermal/fluid-related deficiency within the data center installation associated with the component-related deficiency. For instance, one or more measurements may be obtained by the robotic system, and compared to one or more anticipated values for those measurements provided by a data center model incorporating or assuming the presence of the proper data center component and/or the properly installed data center component. Based on this determined degree of deficiency, an energy penalty may be determined due to the identified component-related deficiency within the data center installation, and based on the energy penalty exceeding a predefined threshold, such as a predefined maximum threshold, an action may be initiated to correct the component-related deficiency within the data center installation. For instance, the robotic system or an operator may be instructed to take corrective action to, for instance, perform a further add, move or change to correct the deficiency, and thereby eliminate (or mitigate) the determined energy penalty. In the example of FIGS. 3A-4B, this may involve replacing perforated floor tile 301 with the originally specified, perforated floor tile 115. In one or more implementations, the robotic system 300 may include one or more manipulators (e.g., robotic arms and grippers) which allow the robotic system to be controlled to change the perforated floor tile (in this example). In certain embodiments, if the energy penalty is less than, for instance, a maximum predefined threshold, but greater than a minimum predefined threshold, then the system may notify an operator of the deficiency to, for instance, let the operator know that the prior add, move or change action did not obtain the desired results, allowing a further add, move or change action to be initiated, if desired. If the penalty is less than the predefined threshold (e.g., less than a minimum predefined threshold), then (in one or more implementations) no action may be taken by the system since the prior add, move or change action attained the desired result.

Figure 5:
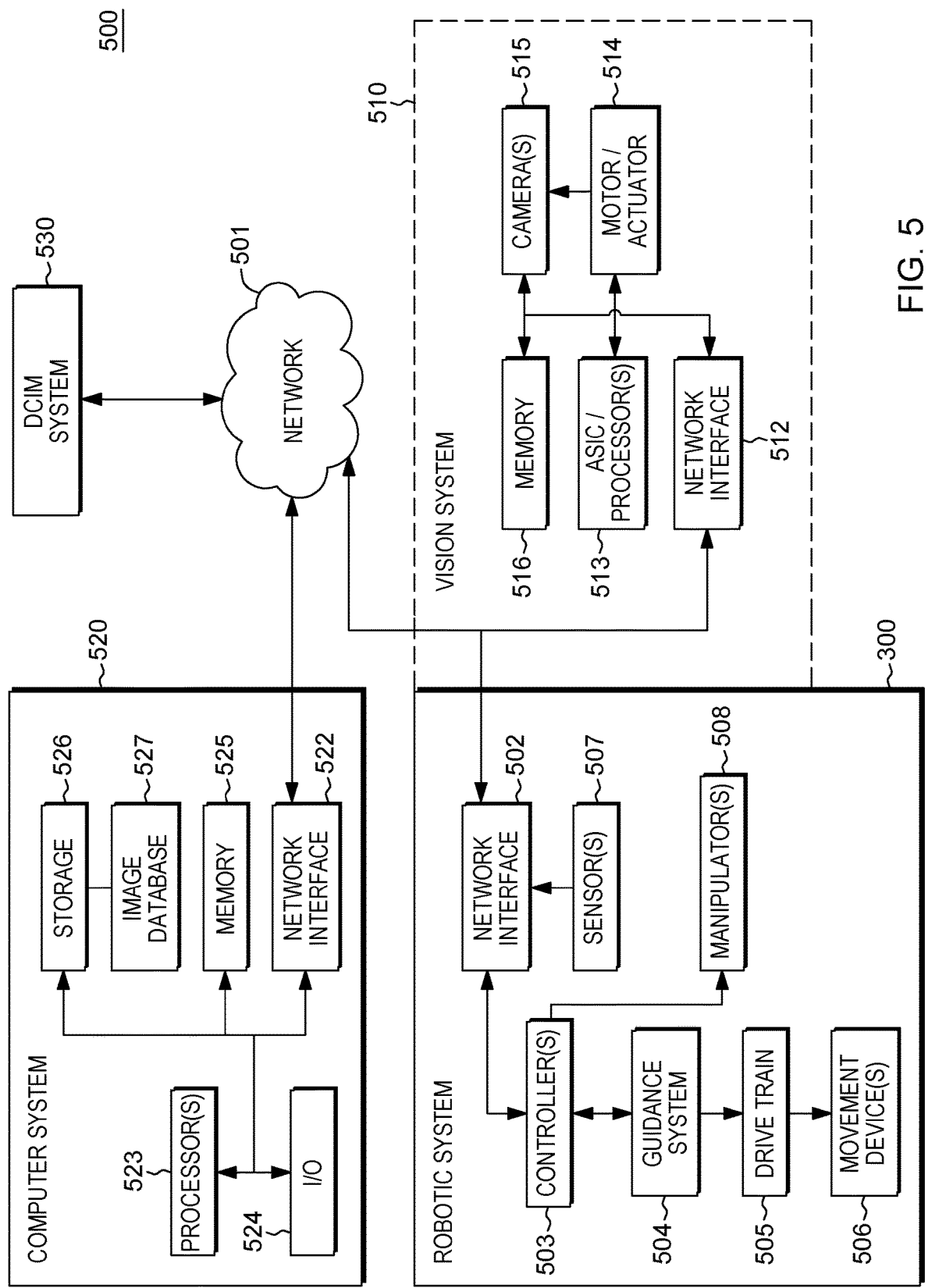
FIG. 5 is a schematic of one embodiment of a system for managing a data center installation, in accordance with one or more aspects of the present invention.

FIG. 5 depicts one embodiment of a system 500 for managing a data center installation, in accordance with one or more aspects of the present invention. In this embodiment, system 500 includes, by way of example only, robotic system 300, a vision system 510, and a computer system 520. In one or more embodiments, vision system 510 may be incorporated within robotic system 300 as, for instance, a subsystem of the robotic system. Alternatively, vision system 510 could be independent from the robotic system, such as a vision system implemented within the data center installation that is able to image substantively all regions and components within the data center. Further, computer system 520 may be part of robotic system 300, or separate from the robotic system, and where separate, may communicate with the robotic system and/or vision system 510 across a network 501. Network 501 may be, for example, a telecommunications network, a local area network (LAN), a wide area network (WAN), such as the Internet, or a combination thereof, and can include wired, wireless, fiber optic connections, etc. Network 501 may include one or more wired and/or wireless networks that are capable of receiving and transmitting data, including image and/or video signals.

As illustrated in the embodiment of FIG. 5, robotic system 300 may include a network interface 502, a controller and/or processor(s) 503, a guidance system 504 which may direct a drive train 505 that drives a movement device 506, such as tracks or wheels to allow for movement of robotic system 300 within a data center installation. Further, robotic system 300 may be provided with one or more sensors 507, such as temperature, pressure and/or airflow sensors, as well as one or more manipulators 508 to allow, for instance, robotic system 300 to perform one or more add, moves or changes within the data center installation as required, for instance, to address an identified component-related deficiency.

In the embodiment illustrated, vision system 510 includes a network interface 512, as well as an ASIC or processor(s) 513, a motor and/or actuator 514, as well as an imaging device, such as a camera 515 and memory 516 for storing, for instance, captured images. Motor and/or actuator 514 may be controlled by the ASIC/processor 513 to orient camera 515 in a desired location at a specified region of the data center installation in order to capture a desired image or video segment from the data center installation. As noted, vision system 510 may be, in one or more embodiments, part of robotic system 300, so as to be moveable within the data center with the robotic system, or could be a separate system, such as a separate data center installed system having a plurality of cameras covering substantively all aspects of the data center installation.

In one or more embodiments, computer system 520 may be in communication with robotic system 300 and/or vision system 510 across network 501. Computer system 520 may include one or more processors 523, for instance, central processing units (CPUs). A processor can include functional components used in the execution of instructions, such as functional components to fetch program instructions from locations such as cache or main memory 525, decode program instructions, and execute program instructions, access memory for instruction execution, and write results of the executed instructions. A processor 523 can also include a register(s) to be used by one or more of the functional components. As shown, computer system 520 may also include memory 525, input/output (I/O) 524, network interface 522, and storage 526, which may include one or more image databases 527. The components of computer system 520 may be coupled to each other via one or more buses and/or other connections. Bus connections may represent one or more of any of several types of bus structures, including a memory bus or memory controller, a peripheral bus, an accelerated graphics port, and a processor or local bus using any of a variety of bus architectures. By way of example, and not limitation, such architectures include the industry standard architecture (ISA), the microchannel architecture (MCA), the enhanced ISA (EISA), the video electronics standards association (VESA) local bus, and the peripheral component interconnect (PCI).

Memory 525 can be or include main or system memory (e.g., Random Access Memory) used in the execution program instructions, storage device(s) such as a hard drive(s), flash media, or optical media as examples, and/or cache memory as examples. Memory 525 can include, for instance, a cache, such as a shared cache, which may be coupled to local caches (examples include L1 cache, L2 cache, etc.) of processor(s) 523. Additionally, memory 525 may be or include at least one computer program product having a set (e.g., at least one) of program modules, instructions, code or the like that is/are configured to carry out functions of embodiments described herein when executed by one or more processors.

Memory 525 can store an operating system and other computer programs, such as one or more computer programs/applications that execute or perform aspects described herein. Specifically, program/applications can include computer readable program instructions that may be configured to carry out functions of embodiments of aspects described herein.

Network interface 522 may be an example I/O interface that enables computer system 520 to communicate with one or more networks 501. Further, storage 526 may be part of computer system 520 or an external storage device. Storage 526 may store one or more programs, one or more computer readable program instructions, and/or data, such as one or more image databases 527, etc. Computer system 520 may include and/or be coupled to and in communication with removable/non-removable, volatile/non-volatile computer system storage media. For example, it may include and/or be coupled to a non-removable, non-volatile magnetic media (typically called a "hard drive").

Computer system 520 may be operational with numerous other general purpose or special purpose computing system environments or configurations. For instance, as depicted in FIG. 5, computer system 520 may be in communication with a data center infrastructure management (DCIM) system 530, which may be overseeing operation of the data center installation. Computer system 520 may take any of a variety of forms, such as described herein.

Figure 6:
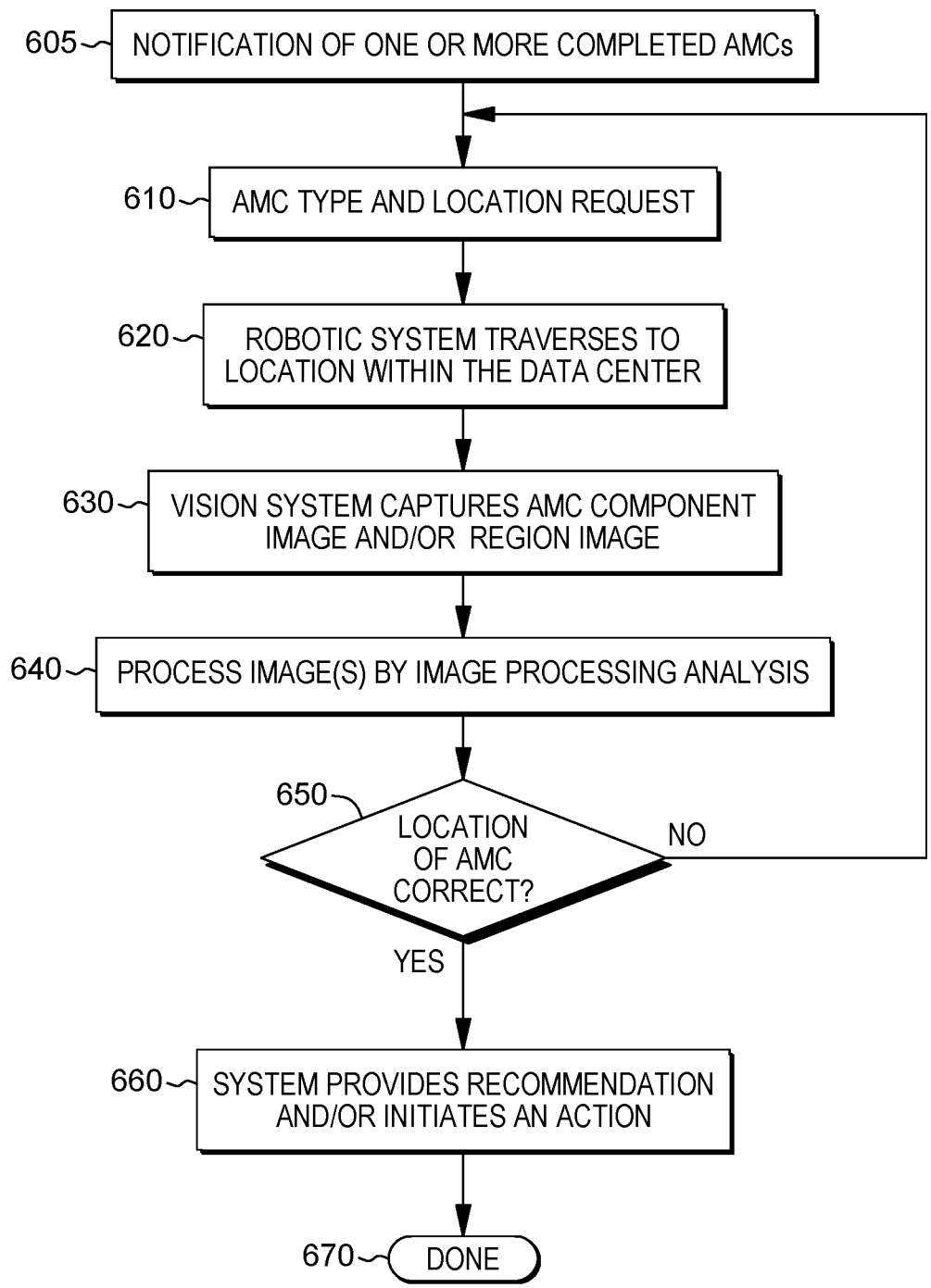
FIG. 6 depicts a further embodiment of an automated process for managing a data center installation, in accordance with one or more aspects of the present invention.

FIG. 6 depicts a further embodiment of an automated process for managing a data center installation, in accordance with one or more aspects of the present invention. As illustrated, process 600 includes receiving notification of one or more completed adds, moves or changes of or to, one or more components within a data center installation 605. The particular add, move or change type and location of the add, move or change 610 is identified, and the robotic system may be instructed to traverse the data center installation to the location where the add, move or change was completed 620. The system may use the vision system to capture an image of the add, move or change within the data center 630. This may include capturing an image of the add, move or change component and/or an image of an add, move or change region within the installation. The system, such as the vision system or the computer system, may process the captured image to identify or confirm that the add, move or change has been completed, and that the correct location was identified and traversed to by the robotic system 640. Processing may inquire whether the location of the captured image is correct 650. If "no", then the robotic system may be redirected to a different location within the data center installation to further evaluate the one or more add, move or change actions within the data center. Once a correct location is identified through image analysis, the system, such as the computer system 520 of FIG. 5, may compare the captured image, depicting the results of the actual add, move or change action, to a saved image depicting the specified or expected add, move or change results, and from this comparison, ultimately derive a recommendation and/or initiate an action to correct, for instance, an identified component-related deficiency 660, which completes the process 670. In one or more implementations, the effect of an actual add, move or change action can be monitored by one or more sensors that allow the robotic system to sense the environment, or through a separate data management system. In one or more embodiments, the computer system may compare what was installed to what was expected to be installed, and then determine a degree of deficiency of the installation (e.g., a degree of thermal, pressure or airflow deficiency). Depending on the degree of deficiency, or more particularly, the associated energy penalty due to the deficiency, an action may be initiated to correct the component-related deficiency.

By way of example only, various types of deficiencies could be noted in a data center installation. For instance, an incorrect type of perforated floor tile may have been used (e.g., 60% open versus 20% open), which causes a reduction in airflow to adjacent IT equipment being cooled in that region. This is the example described above in connection with FIGS. 3A-4B. As part of the process, once the component related deficiency is identified, that is, the incorrect floor tile was identified, measurements, such as one or more thermal measurements of the nearby computing equipment (e.g., servers) within the associated rack (see FIG. 3B) may be evaluated. For instance, it may be determined from temperature measurements that a maximum temperature of 28.4° C. is occurring within the rack with the incorrectly installed perforated floor tile. Using computational fluid dynamics modeling, the anticipated maximum temperature with a properly installed perforated tile may be 26.2° C., and thus, the degree of thermal/fluid-related deficiency in this example might be 2.2° C. This thermal/fluid-related deficiency may then be expressed as an energy penalty, and if the energy penalty (or the thermal/fluid-related deficiency) is above a pre-defined threshold, then the above-noted recommendation and/or action may be initiated to correct, for instance, the identified component-related deficiency within the data center installation.

As another example, a blanking panel may not be in use in a rack after a server system was removed from the rack due to a scheduled add, move or change. This may cause higher temperatures at the inlet to adjacent IT equipment. In another example, after running networking cables beneath a raised floor plenum, the cables may represent a component-related deficiency by blocking one or more perforated tiles and causing lower static pressure than expected. As another example of a component-related deficiency, power or networking cables in the back or front of a rack may be obstructing server airflow through the rack, causing higher server power use than expected. As another example, a new rack may be installed within a data center installation with a gap unintentionally being left between adjacent racks causing, for instance, hot air recirculation around the rack. Note that the above listed examples are provided by way of illustration only, and not by way of limitation. Any component-related deficiency may be identified within a data center and corrected as described herein.

Figure 7:
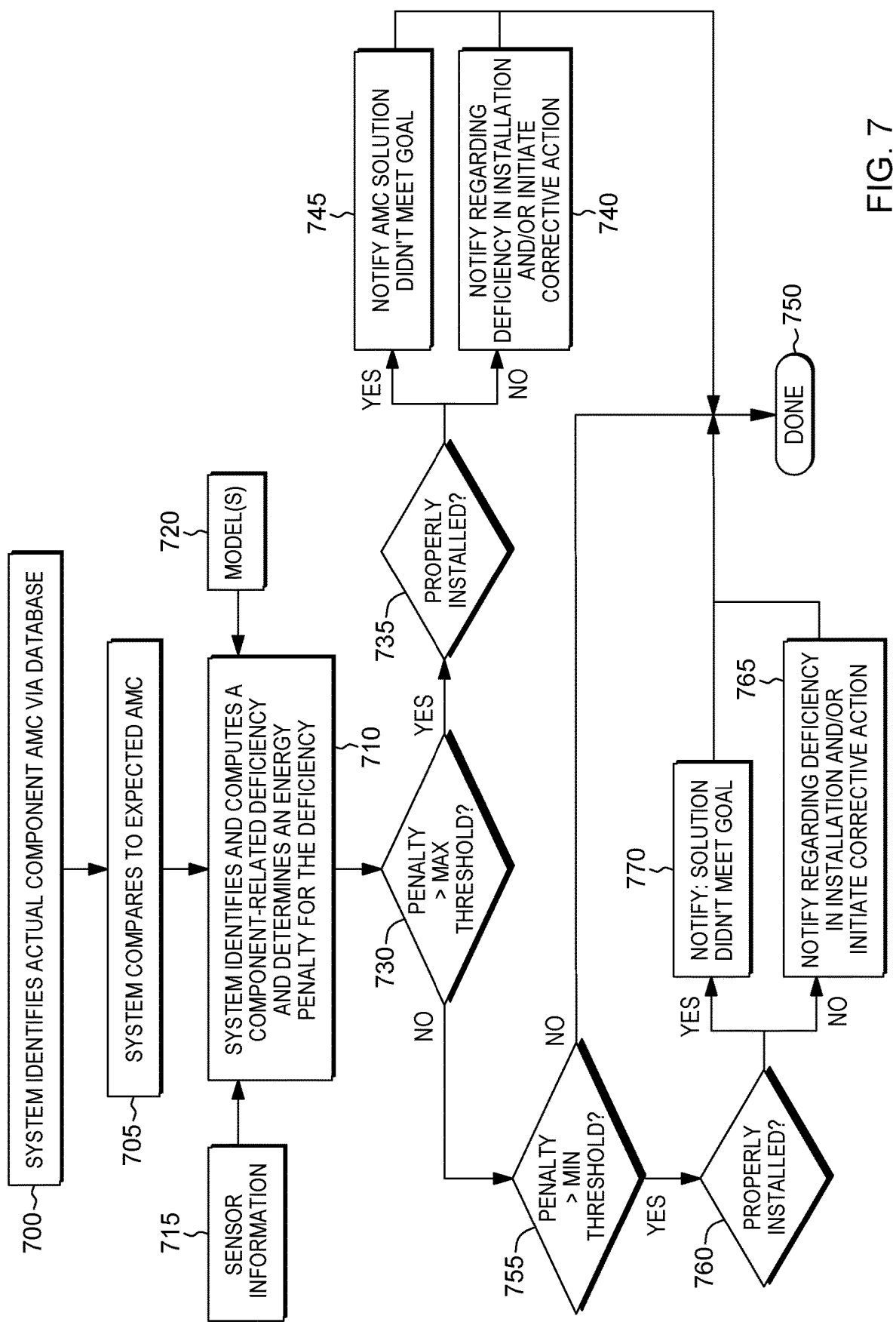
FIG. 7 depicts one embodiment of an automated process for creating a recommendation and/or initiating an action to correct an identified component-related deficiency within a data center installation, in accordance with one or more aspects of the present invention.

FIG. 7 depicts one embodiment of an automated process for creating a recommendation and/or initiating an action to correct an identified component-related deficiency within a data center installation, in accordance with one or more aspects of the present invention. As shown, the process may include identifying by the system an actual component involved in an add, move or change, for instance, via reference to a database 700. In one or more embodiments, the system may identify the installed component that the robotic system is being sent to evaluate. The system may compare the actual installed component to the expected installed component 705. Based on this comparison, the system may identify a component-related deficiency, as well as determine an energy penalty related to the component-related deficiency 710. This may include comparing actual sensed readings within the data center installation 715 (for instance, from one or more sensors associated with the robotic system) with one or more predicted values for the data center obtained from one or more models 720 used in modeling the data center. By way of example, the one or more models may be one or more commercially available computational fluid dynamics modeling tools for predicting, for instance, airflow, pressure and temperature distribution within a data center. For instance, reference Future Facilities DCX™ as one example of a modeling tool for airflow, pressure and temperature distribution within a data center. Future Facilities DCX™ is available from Future Facilities, Inc. of San Jose, Calif.

By way of further example, one or more pressure measurements, for instance, differential pressure measurements at a perforated tile, may be used to determine an airflow-related thermal/fluid-deficiency. This airflow-related thermal/fluid-deficiency would result in an energy penalty, due to a commensurate increase in air-moving device power required to compensate for the airflow-related thermal/fluid-deficiency. In one or more embodiments, the increased air-moving device power would be representative of the energy penalty.

Once the energy penalty associated with the identified component-related deficiency is ascertained, the energy penalty may be compared, in one or more embodiments, to a maximum acceptable predefined threshold 730. If the energy penalty exceeds the maximum predefined threshold 730, then processing may determine whether the component was properly installed 735. If "no", then an operator may be notified to take corrective action and/or the system itself may initiate and/or take the corrective action (e.g., via the robotic system) 740. If installed properly, the system may notify an operator that the add, move or change operation did not meet the desired energy efficiency goal 745, which completes processing 750 of the particular add, move or change action.

In the embodiment of FIG. 7, a second, minimum predefined threshold may be provided 755 below which the ascertained energy penalty is deemed too low to warrant any action, in which case processing is done 750. If the energy penalty is above the minimum predefined threshold, then processing determines whether the add, move or change operation was properly performed using the proper component 760. If "no", then an operator may be notified of the deficiency in the installation and/or the system may initiate a corrective action, such as performing the corrective action via the robotic system 765. Assuming that the component was properly installed, then the system may notify an operator that the specified add, move or change operation did not meet the goal for the add, move or change 770, after which processing of the particular add, move or change action is complete 750.

Those skilled in the art will note from the above description that disclosed herein, in one or more aspects, are methods, systems and computer program products which facilitate managing of a data center installation. In one or more embodiments, the aspects may include or utilize a robotic system which traverses a data center installation, and locates a predetermined, specified region of the data center. The robotic system may identify at that region one or more defects in the installation of data center components, and assess the defects by ascertaining an energy penalty associated with the deficiency, and thus an energy benefit of taking corrective action on the identified component. As part of this process, the robotic system may capture an image at the specified location, and process the image, including connecting to a database of images of properly installed data center components. Using, in one or more embodiments, image processing analytics techniques, the system may identify the deficiency of the installation by comparing the captured image to the images in the database. Based on an identified deficiency, the system may determine a degree of deficiency. Based on the degree of deficiency, the system may determine an energy penalty due to the component-related deficiency. The system may compare the energy penalty to a predetermined threshold for taking corrective action. If the threshold is exceeded, the system may notify an operator of a corrective action to take, and/or may itself take the corrective action. Otherwise, if the penalty is less than a maximum specified threshold, but for instance, greater than a minimum specified threshold, an operator may be notified of the component-related deficiency. If the savings does not exceed a minimum specified threshold, then the system may provide notification of a proper installation.

Further exemplary embodiments of computing environments which may implement one or more aspects of the present invention are described below with reference to FIGS. 8-10.

Figure 8:
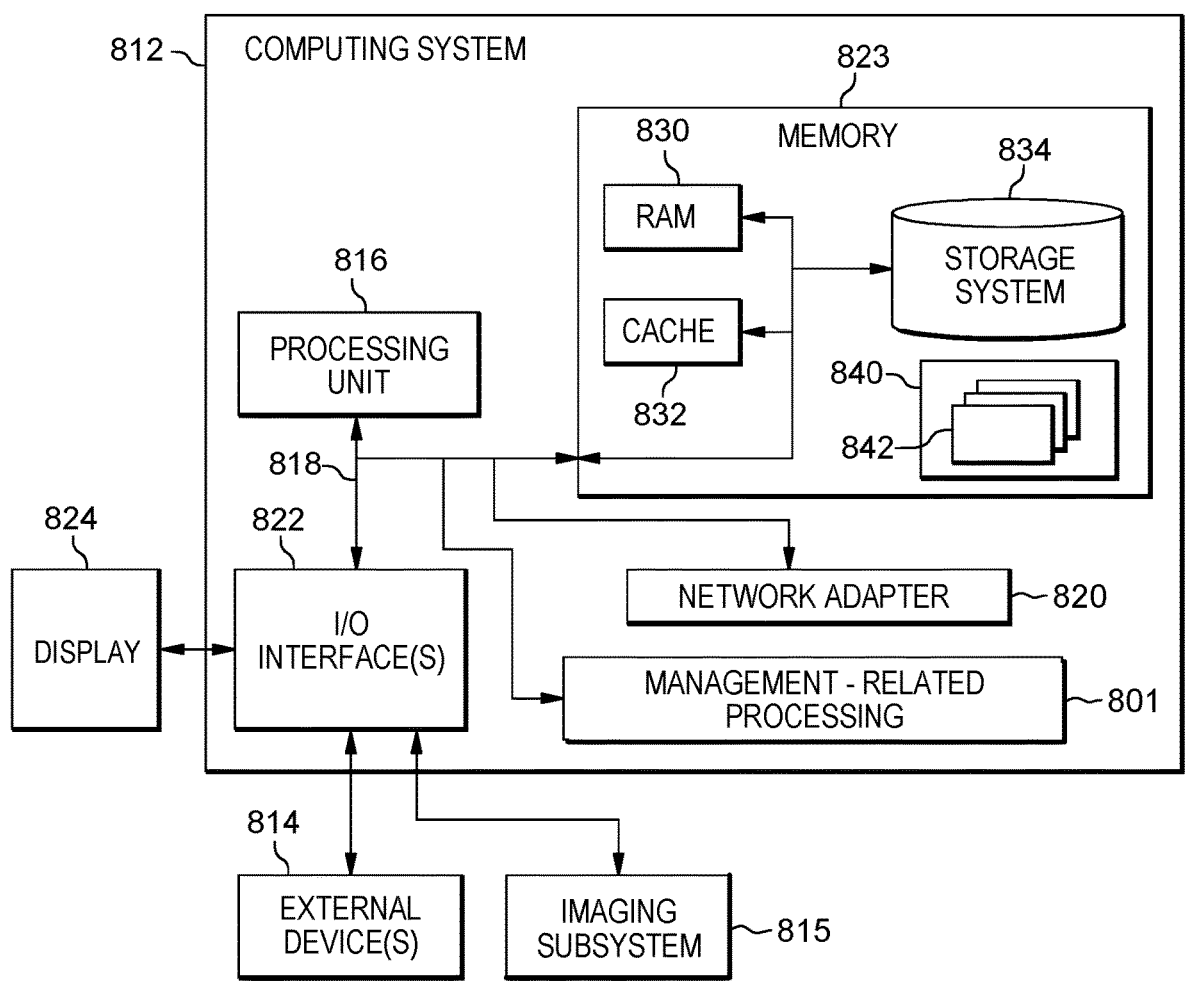
FIG. 8 depicts one embodiment of a computing system which may implement or facilitate implementing one or more aspects of managing of a data center installation, in accordance with one or more aspects of the present invention.

By way of further example, FIG. 8 depicts one embodiment of a computing environment 800, which includes a computing system 812. Examples of well-known computing systems, environments, and/or configurations that may be suitable for use with computer system 812 include, but are not limited to, a server, a desktop computer, a work station, a mobile device, such as a wireless computer, a handheld or laptop computer or device, a mobile phone, a programmable consumer electronic device, a tablet, a personal digital assistant (PDA), or the like.

Computing system 812 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 8, computing system 812, is shown in the form of a general-purpose computing device. The components of computing system 812 may include, but are not limited to, one or more processors or processing units 816, a system memory 823, and a bus 818 that couples various system components including system memory 823 to processor 816.

In one embodiment, processor 816 may be based on the z/Architecture® offered by International Business Machines Corporation, or other architectures offered by International Business Machines Corporation or other companies. z/Architecture® is a registered trademark of International Business Machines Corporation, Armonk, N.Y. USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 812 may include a variety of computer system readable media. Such media may be any available media that is accessible by computing system 812, and it includes both volatile and non-volatile media, removable and non-removable media.

System memory 823 can include computer system readable media in the form of volatile memory, such as random access memory (RAM) 830 and/or cache memory 832. Computing system 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 818 by one or more data media interfaces. As described below, memory 823 may include at least one program product having a set (e.g., at least one) of program modules that are configured to carry out the functions of embodiments of the invention.

Program/utility 840, having a set (at least one) of program modules 842, may be stored in memory 823 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein. Alternatively, a management-related processing system, module, logic, etc., 801 may be provided within computing environment 812.

Computing system 812 may also communicate with one or more external devices 814 such as an imaging subsystem 815, a keyboard, a pointing device, a display 824, etc.; one or more devices that enable a user to interact with computing system 812; and/or any devices (e.g., network card, modem, etc.) that enable computing system 812 to communicate with one or more other computing devices. Such communication can occur via Input/Output (I/O) interfaces 822. Still yet, computing system 812 can communicate with one or more networks such as a local area network (LAN), a general wide area network (WAN), and/or a public network (e.g., the Internet) via network adapter 820. As depicted, network adapter 820 communicates with the other components of computing system, 812, via bus 818. It should be understood that although not shown, other hardware and/or software components could be used in conjunction with computing system 812. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 8. Computing system 812 of FIG. 8 may be practiced in distributed cloud computing environments where tasks are performed by remote processing devices that are linked through a communications network. In a distributed cloud computing environment, program modules may be located in both local and remote computer system storage media including memory storage devices. Computing system 812 is capable of being implemented and/or performing any of the functionality set forth hereinabove.

Figure 9:
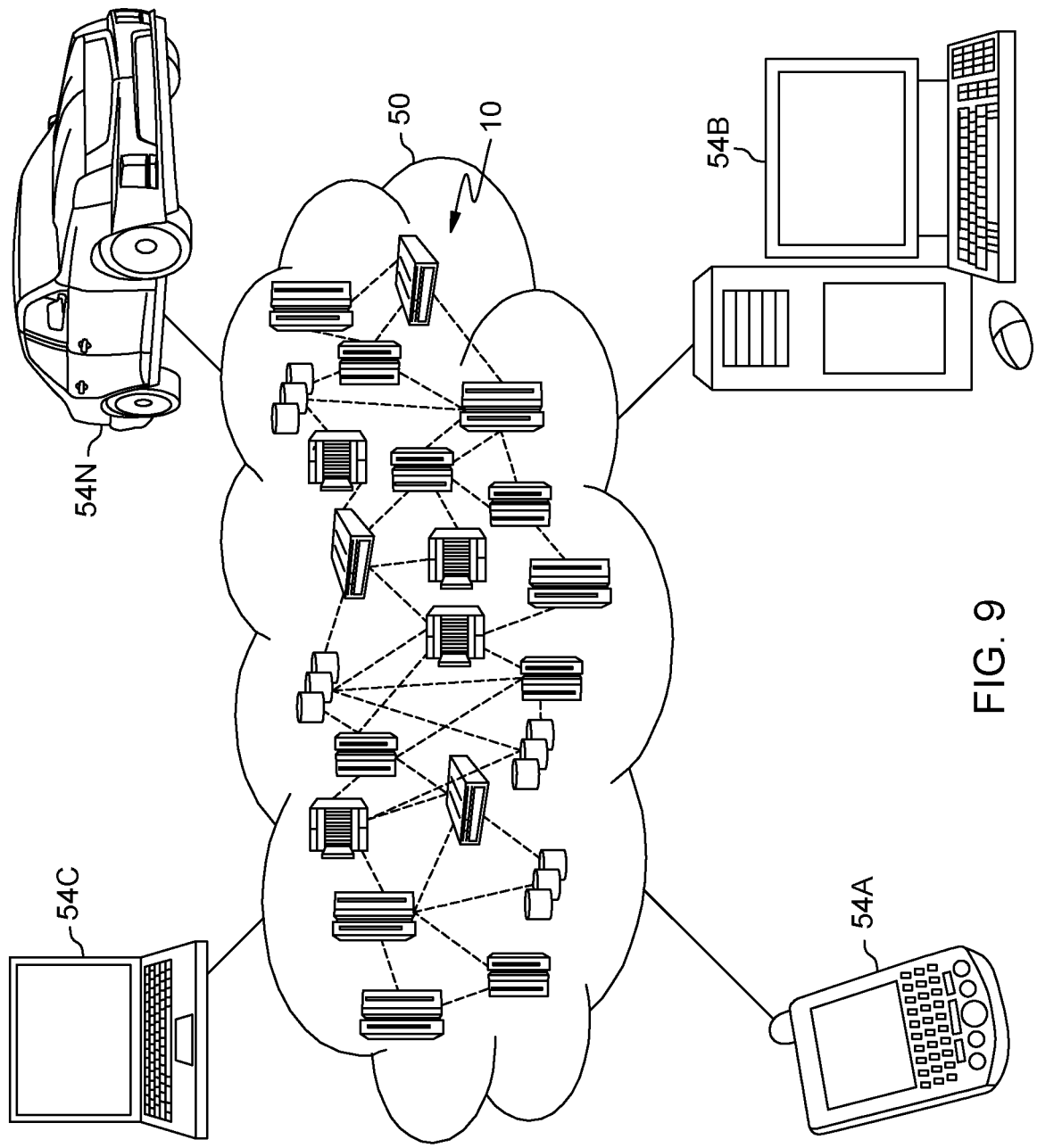
FIG. 9 depicts one embodiment of a cloud computing environment, which may implement, or be used in association with one or more aspects of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 10:
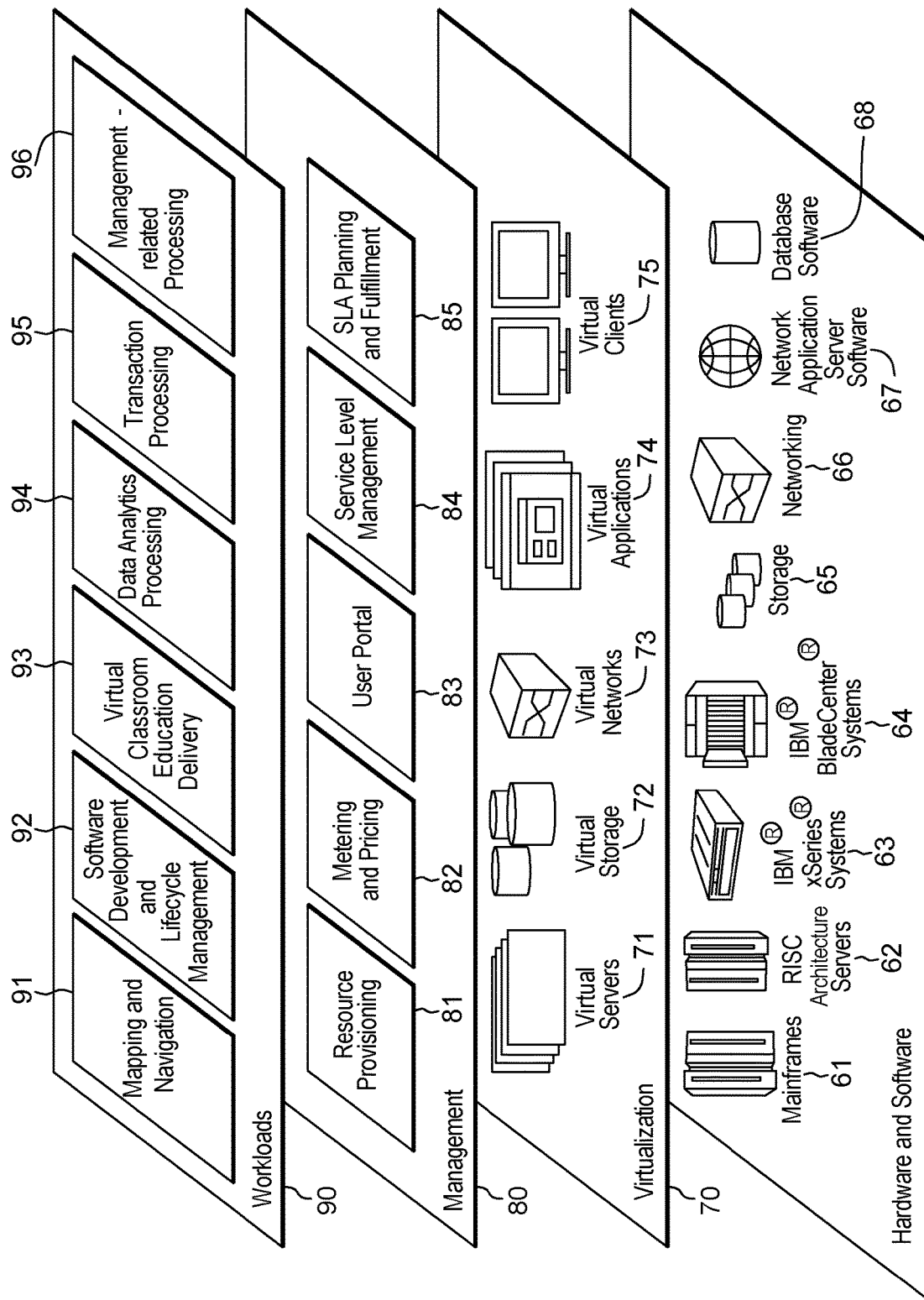
FIG. 10 depicts one example of abstraction model layers, which may facilitate or implement one or more aspects of managing a data center installation, in accordance with one or more aspects of the present invention.

Referring to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and management-related processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of managing a data center installation, the method comprising:
   receiving, by one or more processors, an indication of completion of a manual component add, move or change operation within the data center installation;
   based on receipt of the indication of completion of the manual component add, move or change operation, determining, by the one or more processors, that there is a component-related deficiency within the data center installation related to the component of the data center that was manually added, moved or changed in the data center installation pursuant to the add, move or change operation, the determining including:
   instructing a robotic system to traverse to a region of the data center installation where the component was manually added, moved or changed in the data center installation;
   receiving a captured component image for evaluation from the robotic system within the data center installation, the captured component image being captured by the robotic system and being an image of the component of the data center installation that was manually added, moved or changed in the data center installation pursuant to the add, move or change operation; and
   evaluating, at least in part by image processing analysis, the captured component image to identify the component-related deficiency within the data center installation related to the manual component add, move or change operation, the evaluating comprising:
   using the captured component image to identify, by the one or more processors, the component of the data center installation, the using comprising comparing the captured component image to one or more saved component images; and
   comparing, by the one or more processors, the identified component to an expected component of the add, move or change operation to facilitate identifying the component-related deficiency within the data center installation related to the component of the data center that was manually added, moved or changed in the data center installation pursuant to the add, move or change operation;
   determining, by the one or more processors, based at least in part on one or more measurements within the data center installation, an energy penalty due to the identified component-related deficiency within the data center installation; and
   based on the energy penalty exceeding a predefined threshold, initiating an action to correct the component-related deficiency within the data center installation related to the manual component add, move or change operation.

2. The method of claim 1, further comprising receiving at least one measurement of the one or more measurements within the data center installation from at least one sensor associated with the robotic system, the at least one measurement being at least one measurement related to the component that was added, moved or change in the data center installation.

3. The method of claim 1, wherein the robotic system comprises at least one manipulator, and wherein the action to correct the component-related deficiency is performed, at least in part, by the robotic system using the at least one manipulator.

4. The method of claim 1, wherein the determining comprises ascertaining a degree of thermal/fluid-related deficiency within the data center installation associated with the component-related deficiency, and using the degree of thermal/fluid-related deficiency in determining the energy penalty due to the identified component-related deficiency within the data center installation.

5. The method of claim 4, wherein ascertaining the degree of thermal/fluid-related deficiency comprises comparing the one or more measurements to one or more predicted values for the one or more measurements based on one or more computational fluid dynamic models of the data center installation incorporating one or more specified component-related actions, the one or more specified component-related actions being selected from the group consisting of component adds, component moves and component changes within the data center installation.

6. A system for managing a data center installation, the system comprising:
a memory; and
a processor communicatively coupled to the memory, wherein the system performs a method comprising:
receiving, by one or more processors, an indication of completion of a manual component add, move or change operation within the data center installation;
based on receipt of the indication of completion of the manual component add, move or change operation, determining, by the one or more processors, that there is a component-related deficiency within the data center installation related to the component of the data center that was manually added, moved or changed in the data center installation pursuant to the add, move or change operation, the determining including:
instructing a robotic system to traverse to a region of the data center installation where the component was manually added, moved or changed in the data center installation;
receiving a captured component image for evaluation from the robotic system within the data center installation, the captured component image being captured by the robotic system and being an image of the component of the data center installation that was manually added, moved or changed in the data center installation pursuant to the add, move or change operation; and
evaluating, at least in part by image processing analysis, the captured component image to identify the component-related deficiency within the data center installation related to the manual component add, move or change operation, the evaluating comprising:
using the captured component image to identify, by the one or more processors, the component of the data center installation, the using comprising comparing the captured component image to one or more saved component images; and
comparing, by the one or more processors, the identified component to an expected component of the add, move or change operation to facilitate identifying the component-related deficiency within the data center installation related to the component of the data center that was manually added, moved or changed in the data center installation pursuant to the add, move or change operation;
determining, by the one or more processors, based at least in part on one or more measurements within the data center installation, an energy penalty due to the identified component-related deficiency within the data center installation; and
based on the energy penalty exceeding a predefined threshold, initiating an action to correct the component-related deficiency within the data center installation related to the manual component add, move or change operation.

7. The system of claim 6, wherein the captured component image captures a region of the data center installation where the add, move or change operation was performed.

8. The system of claim 6, further comprising receiving at least one measurement of the one or more measurements within the data center installation from at least one sensor associated with the robotic system, the at least one measurement being at least one measurement related to the component that was added, moved or changed in the data center installation.

9. The system of claim 6, wherein the robotic system comprises at least one manipulator, and wherein the action to correct the component-related deficiency is performed, at least in part, by the robotic system using the at least one manipulator.

10. The system of claim 6, wherein the determining comprises ascertaining a degree of thermal/fluid-related deficiency within the data center installation associated with the component-related deficiency, and using the degree of thermal/fluid-related deficiency in determining the energy penalty due to the identified component-related deficiency within the data center installation.

11. The system of claim 10, wherein ascertaining the degree of thermal/fluid-related deficiency comprises comparing the one or more measurements to one or more predicted values for the one or more measurements based on one or more computational fluid dynamic models of the data center installation incorporating one or more specified component-related actions, the one or more specified component-related actions being selected from the group consisting of component adds, component moves and component changes within the data center installation.

12. A computer program product for managing a data center installation, the computer program product comprising:
a computer readable storage medium having program instructions embodied therewith, the program instructions being executable by a processor to cause the processor to:
receive, by one or more processors, an indication of completion of a component add, move or change operation within the data center installation;
based on receipt of the indication of completion of the manual component add, move or change operation, determine, by the one or more processors, that there is a component-related deficiency within the data center installation related to the component of the data center that was manually added, moved or changed in the data center installation pursuant to the add, move or change operation, the determining including:
instruct a robotic system to traverse to a region of the data center installation where the component was manually added, moved or changed in the data center installation;
receive a captured component image for evaluation from the robotic system within the data center installation, the captured component image being captured by the robotic system and being an image of the component of the data center installation that was manually added, moved or changed in the data center installation pursuant to the add, move or change operation; and evaluate, at least in part by image processing analysis, the captured component image to identify the component-related deficiency within the data center installation related to the manual component add, move or change operation, the evaluating comprising:

using the captured component image to identify, by the one or more processors, the component of the data center installation, the using comprising comparing the captured component image to one or more saved component images; and comparing, by the one or more processors, the identified component to an expected component of the add, move or change operation to facilitate identifying the component-related deficiency within the data center installation related to the component of the data center that was manually added, moved or change in the data center installation pursuant to the add, move or changed operation;

determine, by the one or more processors, based at least in part on one or more measurements within the data center installation, an energy penalty due to the identified component-related deficiency within the data center installation; and based on the energy penalty exceeding a predefined threshold, initiating an action to correct the component-related deficiency within the data center installation related to the manual component add, move or change operation.

13. The computer program product of claim 12, wherein the determining comprises ascertaining a degree of thermal/fluid-related deficiency within the data center installation associated with the component-related deficiency, and using the degree of thermal/fluid-related deficiency in determining the energy penalty due to the identified component-related deficiency within the data center installation.

* * * * *